UNITED STATES PATENT OFFICE.

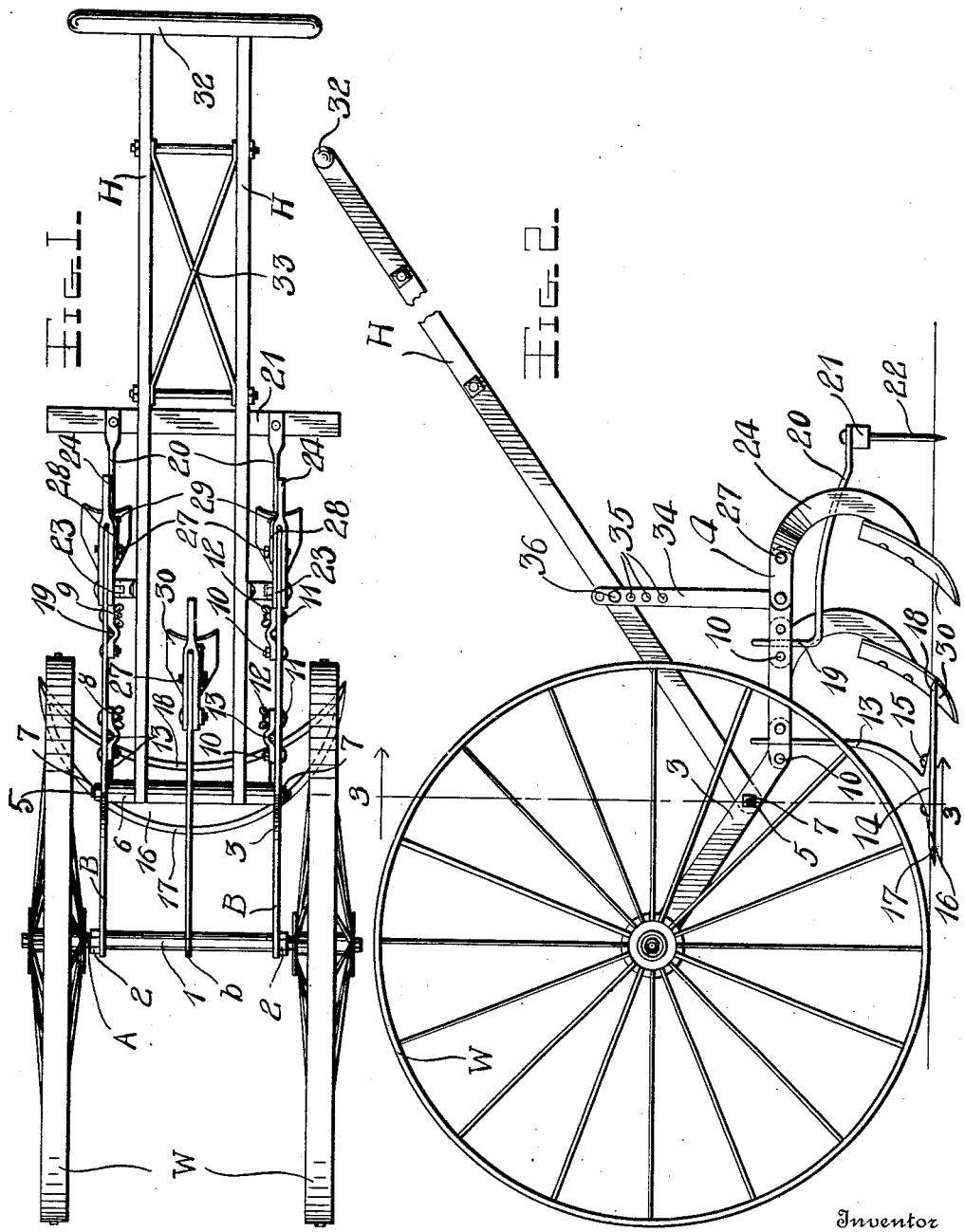

JAMES H. RHOTEN, OF DANVILLE, ILLINOIS.

GARDEN-PLOW.

1,131,007.  Specification of Letters Patent.  Patented Mar. 9, 1915.

Application filed February 12, 1914. Serial No. 818,308.

*To all whom it may concern:*

Be it known that I, JAMES H. RHOTEN, a citizen of the United States, residing at Danville, in the county of Vermilion and State of Illinois, have invented certain new and useful Improvements in Garden-Plows; and I do declare the following to be a full, clear, and exact description of the invention, such as will enable others skilled in the art to which it appertains to make and use the same.

This invention relates to improvements in garden plows and the primary object of the same is to provide a plow of this character which will effectually cut any weeds in the soil being worked and will then plow and harrow the same at one operation.

A secondary object is to provide means whereby the plow points or shares may be raised when not in operation.

Still another object is to form the weed cutter in such a manner as to render it effective both on its front and rear edges.

With the above objects in view, the invention resides in certain novel features of construction and combination herein described and claimed and shown in the drawings, wherein:—

Figure 1 is a plan view of my improved garden plow and Fig. 2 is a side elevation thereof.

In the accompanying drawings, I have shown my improved garden plow as comprising a supporting axle A, supporting wheels W revolubly mounted on the outer ends thereof, rearwardly extending draw bars B and *b*, operating handles H and a plurality of implements which will be hereinafter described. The axle A passes through suitable openings in the forward ends of the draw bars and through sleeves 1 which are disposed between the draw bars B and *b*, nuts 2 being threaded on said axle and into contact with the outer sides of the bars B. By this mounting, the forward ends of said draw bars are securely held in position on the axle A. From the axle A, the draw bars B and *b* incline downwardly and rearwardly as at 3 and then extend rearwardly in a substantially horizontal plane as shown at 4. Near the lower ends of the inclined portions 3, a transverse rod 5 passes through the draw bars B and *b* and through the forward ends of the handles H, sleeves 6 being mounted on said rod between the various elements through which it passes and nuts 7 being threaded on the opposite ends of said rod for the purpose of clamping the parts securely together in spaced relation. The outermost draw bars B extend a greater distance to the rear than the central draw bar *b* and the bars B are provided with front and rear clamps 8 and 9, respectively, said clamps being here shown in the form of metal plates having their central portions bulged inwardly, thus providing ears to each side of said inwardly bulged portions. One of the ears on each clamp, is secured as at 10 to said bars B while the other ear of each of said clamps is secured to said bar by means of bolts 11 having thumb nuts 12. The forward clamps 8 are provided for the purpose of securing upright arms 13 having their lower portions provided with feet 14 which are secured, as by rivets 15 to a crescent shaped weed cutting blade 16. The cutter 16 is sharpened on both its front and rear edges as shown at 17 and 18 and its operation will be hereinafter described. The rearward clamps 9 are employed for securing in position, upturned ends 19 of rearwardly extending resilient arms 20 which are secured to a laterally extending bar 21 from which depend a plurality of harrow teeth 22.

Pivoted as at 23 to the rear end of each draw bar B and *b* is a rearwardly extending downwardly curved plow beam 24 which as shown, has its forward end bifurcated and straddling said draw bars. In rear of its pivot 23, each plow beam is provided with alined openings through which and an opening in each of said draw bars, a headed pin 27 is adapted to pass, said pin being held normally in position by a flat leaf spring 28 which is secured at 29 to said plow beam. The lower end of each of said plow beams may carry any suitable plow point or share 30. By this specific mounting of the plow beams 24, they may be readily raised out of engagement with the soil by simply retracting their pins 28 whereupon they may be swung upwardly and said pins may be then released, whereupon their springs 28 will force them again inwardly and will cause them to contact with the upper sides of the draw bars and thus retain the beams in raised position.

By the above described construction and arrangement of parts, when the machine is propelled forwardly over the earth, the forward or convex edge of the cutter 16 will successfully cut any weeds or grass in its path. The plow blades 30, following the cutter 16, will now effectually loosen the earth and will tend to turn said weeds and grass under and the harrow teeth 22 will then effectually pulverize and smooth the ground previously worked by said cutter and said plow blades. When cultivating between rows of products, the implements will be left lowered as shown in Figs. 1, 2 and 3 and their operation will be as above stated. During this operation, should it be noted that weeds are growing very close to certain of the hills, the points 31 of the cutter 16 may be passed in front of said weeds whereupon the entire machine may be moved slightly to the rear. This operation will cause the rear cutting edge 17 of the cutter 16 to produce the desired effect upon said weeds. This I consider a very important feature of my invention, since it eliminates the necessity of employing a hoe for this purpose. When it is desired to straddle a row of products, the central plow blade is raised in the manner hereinbefore described, and the cutter 16 and the harrow are either raised within their clamps or entirely removed. It is to be understood that when it is desired to have the central plowshare alone in operation, the outer shares may be raised out of contact with the ground and the cutter and harrow may be either raised or entirely removed. In other words, by the above positioning and mounting of parts, any one or all of the implements may be brought into play.

The handles H are preferably connected at their upper ends by a transverse hand grip 32, braced as at 33, and are connected to the draw bars B by upright links 34 which are secured at their lower ends to said bars, while their upper ends are provided with pluralities of openings 35 through which bolts 36 are adapted to pass, and thus adjustably secure said handles on the frame formed by the various draw bars. I have found that by inclining the forward ends of said draw bars and by securing the handles H thereto in a plane beneath the axle A, the efficiency of the machine is greatly increased, since the pressure in pushing the machine forwardly tends to maintain the machine in upright position.

Although I have described my invention with considerable minuteness, I do not wish to be limited to details of construction other than those amplified in the appended claim.

Having thus described my invention, what I claim as new and desire to secure by Letters-Patent is:

A hand plow comprising a supporting axle, a number of draw-bars extending rearwardly therefrom, a transverse rod passing through said draw-bars, an operating handle in the form of spaced side bars inclining upwardly and rearwardly from said rod and having their forward ends mounted thereon, spacing sleeves between said forward ends of the bars and said draw-bars, nuts on the opposite ends of said rod, a transverse hand grip carried by the rear ends of said side bars, and adjustable brace bars connected to certain of said draw-bars and to said side bars.

In testimony whereof I have hereunto set my hand in presence of two subscribing witnesses.

JAMES H. RHOTEN.

Witnesses:
RAY F. BARNETT,
W. B. DENNIS.

Copies of this patent may be obtained for five cents each, by addressing the "Commissioner of Patents, Washington, D. C."